US009482825B1

United States Patent
Gniadek

(10) Patent No.: US 9,482,825 B1
(45) Date of Patent: Nov. 1, 2016

(54) INGRESS PROTECTED OPTICAL FIBER CONNECTOR HAVING SMALL DIAMETER (MINI-IP CONNECTOR)

(71) Applicant: SENKO ADVANCED COMPONENTS, INC., Marlborough, MA (US)

(72) Inventor: Jeffrey Gniadek, Northbridge, MA (US)

(73) Assignee: Senko Advanced Components, Inc, Marlborough, MA (US)

( * ) Notice: Subject to any disclaimer, the term of this patent is extended or adjusted under 35 U.S.C. 154(b) by 0 days.

(21) Appl. No.: 14/996,845

(22) Filed: Jan. 15, 2016

Related U.S. Application Data

(63) Continuation-in-part of application No. 14/698,267, filed on Apr. 28, 2015.

(51) Int. Cl.
G02B 6/38 (2006.01)

(52) U.S. Cl.
CPC ........... *G02B 6/3885* (2013.01); *G02B 6/3817* (2013.01); *G02B 6/3825* (2013.01); *G02B 6/3847* (2013.01); *G02B 6/3861* (2013.01); *G02B 6/3889* (2013.01); *G02B 6/3894* (2013.01)

(58) Field of Classification Search
CPC  G02B 6/3887;  G02B 6/3885;  G02B 6/3817; G02B 6/3825;  G02B 6/3847;  G02B 6/3861; G02B 6/3889;  G02B 6/3894
See application file for complete search history.

(56) References Cited

U.S. PATENT DOCUMENTS

| | | | | |
|---|---|---|---|---|
| 2004/0228589 | A1* | 11/2004 | Melton | G02B 6/3869 385/100 |
| 2006/0153503 | A1* | 7/2006 | Suzuki | G02B 6/3807 385/53 |
| 2008/0044137 | A1* | 2/2008 | Luther | G02B 6/3869 385/60 |
| 2014/0355936 | A1* | 12/2014 | Bund | G02B 6/3825 385/81 |

OTHER PUBLICATIONS

International Search Report and Written Opinion dated May 19, 2016 from counterpart International Application No. PCT/US16/28266, International Filing Date Apr. 19, 2016.

* cited by examiner

*Primary Examiner* — Peter Radkowski
(74) *Attorney, Agent, or Firm* — Pepper Hamilton LLP

(57) ABSTRACT

A multi-fiber optical fiber connector including a connector housing having a front portion and a rear portion is disclosed. A multi-fiber ferrule is disposed in the connector housing such that it projects from the front portion of the connector housing. The rear portion of the connector housing includes at least a first channel configured to receive a plurality of optical fibers of an optical cable and to couple the optical fibers to the ferrule, and a second channel configured to receive a strength member of the optical cable. The multi-fiber optical fiber connector may be an ingress protected optical fiber connector, and may have an outside diameter less than about 15.8 mm, such as about 14 mm.

15 Claims, 12 Drawing Sheets

INGRESS PROTECTED OPTICAL FIBER CONNECTOR HAVING SMALL DIAMETER (MINI-IP CONNECTOR)

CROSS-REFERENCE TO RELATED APPLICATIONS

This application is a continuation-in-part of U.S. patent application Ser. No. 14/698,267 filed on Apr. 28, 2015, which is incorporated herein by reference in its entirety.

BACKGROUND

The present disclosure relates generally to optical fiber connectors and systems, and specifically to slender optical fiber connectors that have relatively small diameters, and to ingress protected optical fiber connectors and systems.

Demand for bandwidth by enterprises and individual consumers continues to experience exponential growth. To meet this demand efficiently and economically, data centers have to achieve ultra-high density cabling with low loss budgets. Fiber optics have become the standard cabling medium used by data centers to meet the growing needs for data volume, transmission speeds, and low losses. An optical fiber connector is a mechanical device disposed at an end of an optical fiber, and acts as a connector of optical paths, for example when optical fibers are joined to each other. An optical fiber connector may be coupled with an adapter to connect an optical fiber cable to other optical fiber cables or devices. An adapter generally includes a housing, or portion of a housing, having at least one port which is configured to receive and hold a connector to facilitate the optical connection of one connector to another connector or other device.

In external applications wherein the adapters and connectors may be exposed to weather, such as rain or moisture, the connectors may be configured as ingress protection (IP) connectors that are waterproof. However, traditional ingress protected optical fiber connectors and/or adapters are relatively bulky. Furthermore, a conventional optical fiber connector has many constituent parts. For example, referring to FIG. 1, U.S. Pat. No. 6,318,903 B 1, entitled "Optical fiber connector for back plane" discloses an optical fiber connector 11 including a protective dust cap 48, a connector housing 12, a ferrule barrel assembly 20, a coil spring 26, an insert 27, a crimping member 34, a clip member 40, a protective boot 46 and an incoming fiber cable 36, which are assembled in sequence so as to finish the optical fiber connector 11 shown in FIG. 2.

A conventional optical fiber connector that has many constituent parts results in a relatively large outside diameter, and also necessitates more complex assembly and manufacturing processes. Accordingly, there is a need for optical fiber connectors, including ingress-protected optical fiber connectors, that have relatively small diameters.

SUMMARY

Embodiments disclosed herein address the aforementioned shortcomings by providing optical fiber connectors that have relatively small diameters. In some embodiments, the connectors may be ingress protected optical fiber connectors. For example, in one embodiment, an ingress-protected or hardened connector may have an outside diameter of about 14 millimeters (mm). In other embodiments, connectors may have an outside diameter less than about 15.8 mm. In yet other embodiments, a connector system may include an adapter. In various embodiments disclosed herein, small diameter connectors may be achieved by providing connectors having less constituent components compared to prior art embodiments.

According to one embodiment, an optical fiber connector comprises a connector housing having a front portion and a rear portion, and a ferrule disposed in the connector housing such that it projects from the front portion of the connector housing. The rear portion of the connector housing may include a plurality of channels, a first channel of the plurality of channels being configured to receive an optical fiber of an optical cable and to couple the optical fiber to the ferrule, and a second channel of the plurality of channels being configured to receive a strength member of the optical cable. In one embodiment, a third channel of the plurality of channels may further be configured to receive another strength member of the optical cable.

According to another embodiment, a multi-fiber optical fiber connector comprises a connector housing having a front portion and a rear portion, and a multi-fiber ferrule disposed in the connector housing such that it projects from the front portion of the connector housing. The rear portion of the connector housing may include a plurality of channels, at least a first channel of the plurality of channels being configured to receive a plurality of optical fibers of an optical cable and to couple the optical fibers to the ferrule, and a second channel of the plurality of channels being configured to receive a strength member of the optical cable. In one embodiment, a third channel of the plurality of channels may further be configured to receive another strength member of the optical cable. Embodiments of multi-fiber optical fiber connectors may include multi-fiber ferrules, for example an MT-RJ ferrule or an MT/MPO ferrule.

The optical fiber connector may be an ingress protected optical fiber connector, having an outside diameter of about 14 mm. The front portion and the rear portion of the connector housing may form an integral structure. In various embodiments, the second channel of the plurality of channels may be coupled to a respective strength member of the optical cable using an adhesive. Further, a third channel of the plurality of channels may be coupled to a respective strength member of the optical cable using an adhesive. In some embodiments, the first channel of the plurality of channels, which may be the central channel, may be coupled to the optical fiber of the optical cable using an adhesive. In some embodiments, the connector housing may comprise metal.

In various embodiments, the optical fiber connector may further comprise a coupling nut disposed around the rear portion. The coupling nut may be a ¼ turn coupling nut. The optical fiber connector may further comprise an adapter coupled to the connector housing by the coupling nut. In some embodiments, the optical fiber connector may further comprise either a strain relief boot or a heat shrink at a transition between the optical cable and the rear portion of the connector housing. The coupling nut may be fixed in position between a stop disposed on the connector housing and either the strain relief boot or the heat shrink. The optical fiber connector may further comprise at least one O-ring. For example, a first O-ring may be disposed near the stop and a second O-ring may be disposed at the coupling nut. In one embodiment of an optical fiber connector having a coupling nut and O-rings, the outside diameter may be about 14 mm.

In various embodiments disclosed herein, the ferrule may have a diameter of about 2500 microns, and the front portion of the connector housing may be configured as an SC connector.

The foregoing, as well as additional objects, features and advantages of the present disclosure will be more apparent from the following detailed description, which proceeds with reference to the accompanying drawings.

DETAILED DESCRIPTION

As used herein, the term "optical fiber" is intended to apply to all types of single mode and multi-mode light waveguides, including one or more bare optical fibers, coated optical fibers, loose-tube optical fibers, tight-buffered optical fibers, ribbonized optical fibers, bend performance optical fibers, bend insensitive optical fibers, nanostructured optical fibers or any other expedient for transmitting light signals. The term optical fiber cable may further include multi-fiber optic cables having a plurality of the optical fibers.

For connection of cables together or with other fiber optic devices, the terminal ends of a cable may include a connector. A connector may include a housing structure configured to interact with and connect with an adapter. An adapter, in a simple form, may include two aligned ports for aligning fiber optic connectors and/or electrical connectors therein to align and connect optical fibers end-to-end, or allow for pin/socket electrical connections. For weatherproof or waterproof installations, the connectors may include protective housings and seals to inhibit water penetration. Such connectors may be named IP connectors, or Ingress Protection connectors, and may include different levels of 'ingress protection' depending on the environment to which they will be exposed. While the general discussion herein is directed to IP connecters, the invention is not meant to be limited to such and may also be applied to other types of connectors as well.

Figure 1:
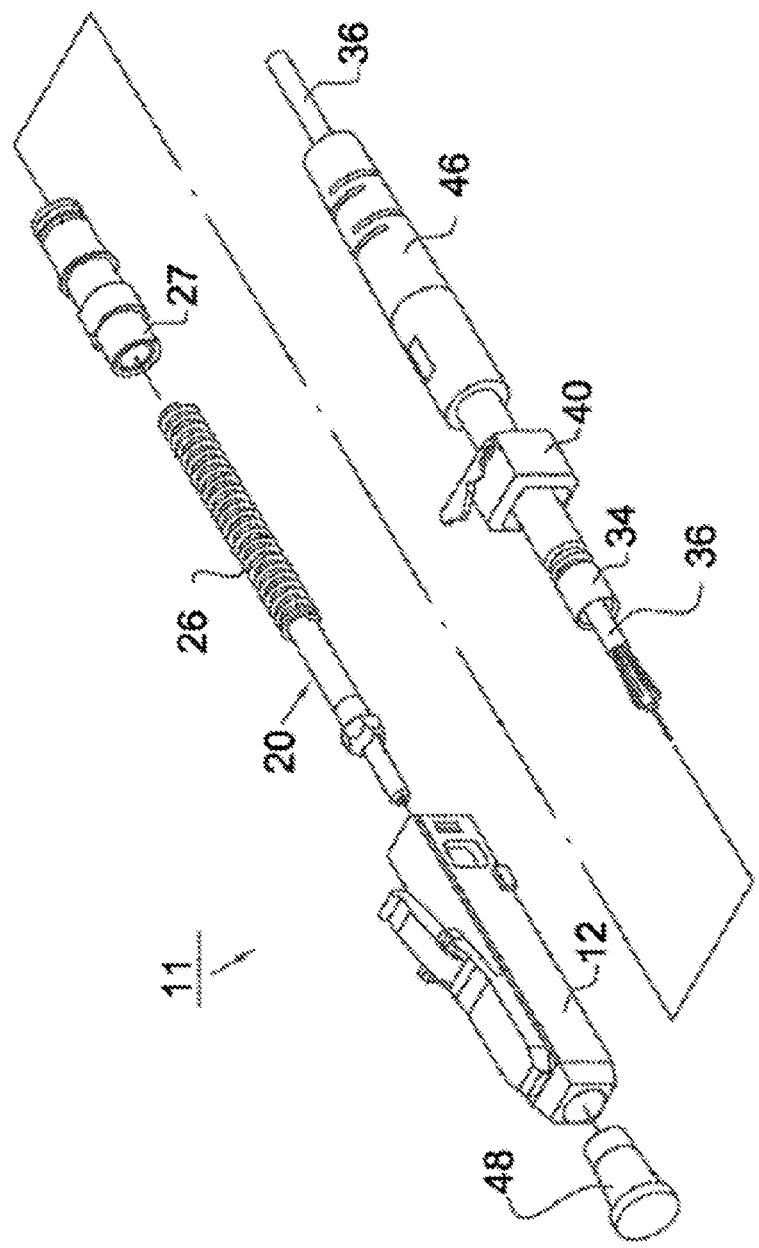
FIG. 1 is an exploded view of a prior art embodiment of a fiber optic connector showing numerous constituent parts.
Figure 2:
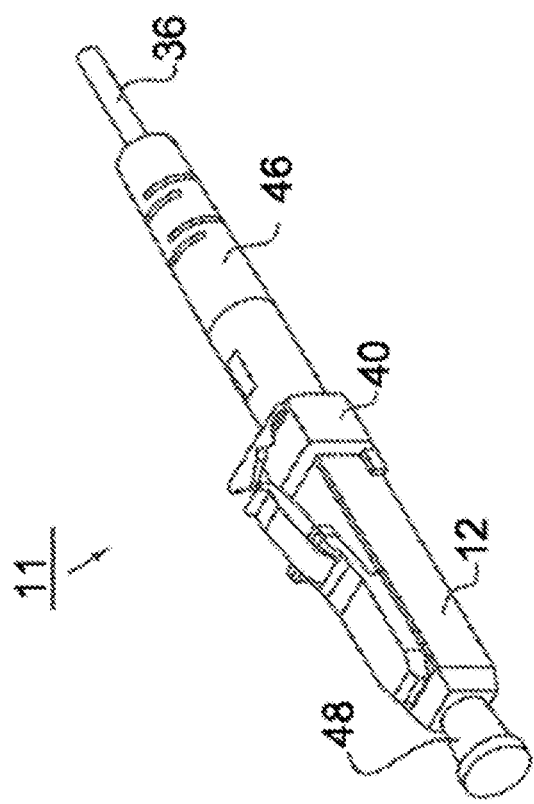
FIG. 2 is a perspective view of the prior art embodiment of FIG. 1.

In various embodiments disclosed herein, small diameter optical fiber connectors may be achieved by providing optical fiber connectors having less constituent components compared to prior art embodiments. For example, various embodiments disclosed herein need not use a crimping member 34 as illustrated in FIGS. 1 and 2. Further, various embodiments need not provide separate ferrule assembly and retaining assembly for retaining the connection of an optical fiber with the ferrule. Instead, various embodiments minimize both the number of components and the size of components by using a single assembly that couples with an optical fiber cable. This results in a slender connector, for example an ingress-protected or hardened connector having an outside diameter of about 14 mm. In other embodiments, optical fiber connectors may have an outside diameter less than or equal to about 15.8 mm.

Figure 3:
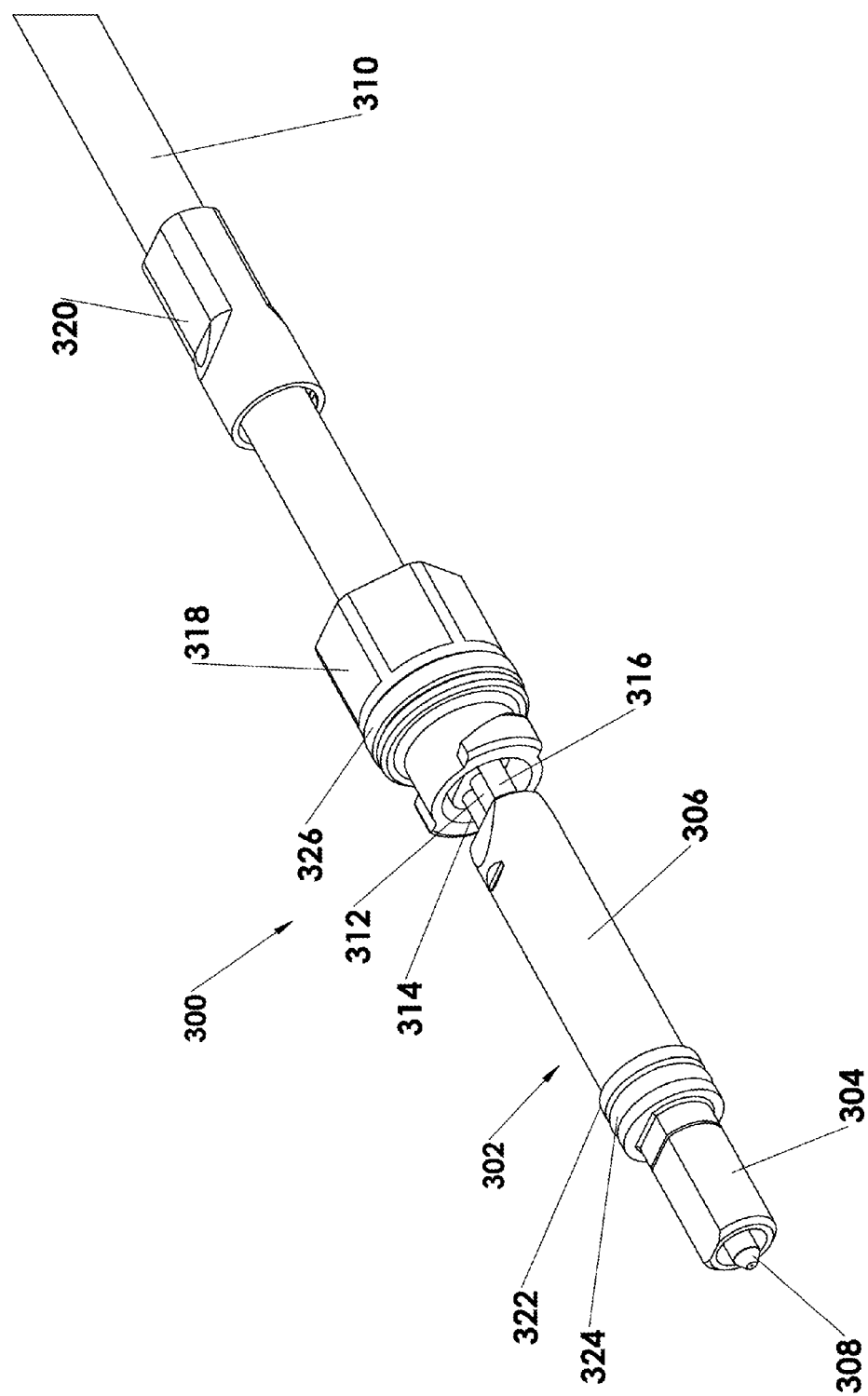
FIG. 3 is an exploded view of an ingress protection (IP) fiber optic connector according to aspects of the present disclosure.

FIG. 3 shows an exploded view of an ingress protected fiber optic connector 300 according to aspects of the present disclosure. The fiber optic connector 300 includes a connector housing 302 including a front portion and a rear portion 306. The connector 300 further includes a ferrule 308 which is housed within the connector housing 302 and projects from the front portion 304.

FIG. 3 further shows an optical fiber cable 310 having an optical fiber 312, and two strength members 314 and 316. As shown, the optical fiber 312 may be centrally positioned, whereas the strength members may be peripherally positioned within the optical cable 310.

The rear portion 306 includes a plurality of channels (not shown in FIG. 3 but shown and described further below in relation with FIG. 6). For example, the plurality of channels may include three channels. The plurality of channels may be configured to receive and couple to optical fibers and strength members of the optical cable 310. Specifically, a first channel of the plurality of channels is configured to receive the optical fiber 312 of the cable 310. The first channel is further configured to extend to the ferrule 308 and thereby allow coupling of the optical fiber 312 to the ferrule 308.

Additional channels of the plurality of channels in the rear portion may be configured to receive strength members of the cable 310. For example, a second channel of the plurality of channels of the connector 300 is configured to receive the strength member 314 of the cable 310. Further, a third channel of the plurality of channels of the connector 300 is configured to receive the strength member 316 of the cable 310. Peripheral channels disposed in the rear portion 306, that is the second and third channels, may be coupled to the strength members 314 and 316 respectively using an adhesive. Further, the optical fiber 312 may be coupled to the first, central channel of the rear portion 306 using an adhesive.

In other embodiments, a connector may include a different number of channels than shown in FIG. 3. For example, a connector may include at least one channel configured to receive an optical fiber from an optical cable and to couple the optical fiber to the ferrule, and at least one channel configured to receive a strength member of the optical cable. Channels configured to receive strength members need not reach the front portion 304 of the connector 300.

The front portion 304 and the rear portion 306 of the connector 300 form an integral structure. Advantages of an integral structure include minimizing the number of constituent components and reducing the outside diameter of the connector. The connector housing 302 of the connector 300 comprises metal.

As shown in FIG. 3, the connector 300 further includes a coupling nut 318. The coupling nut may be disposed around the rear portion 316, as shown. A coupling nut may be provided for coupling to an adapter. In some embodiments, the coupling nut may be a ¼ turn coupling nut. In some embodiments, as shown and described below with reference to FIGS. 5 and 6, a connector may further comprising an adapter coupled to the connector housing by the coupling nut.

The connector 300 of FIG. 3 further comprises a strain relief boot 320. The strain relief boot 320 is disposed at a transition between the optical cable 310 and the rear portion 306 of the connector housing 302. In other embodiments, a connector may include a heat shrink at a transition between the optical cable and the rear portion of the connector housing. Further, the connector includes a stop 322 disposed on the connector housing 302. As shown, the coupling nut 318 is fixed in position between the stop 322 and the strain relief boot 320. In other embodiments, the coupling nut may be fixed between a stop and a heat shrink. This prevents the coupling nut from sliding along the connector 300 or the cable 310.

Various embodiments of connectors disclosed herein may be ingress protected and configured to withstand weather elements. Various embodiments may include at least one O-ring. For example, the optical fiber connector 300 includes a first O-ring 324 disposed near the stop 322, and a second O-ring 326 disposed at the coupling nut.

The optical fiber connector 300 is an ingress protected connector having an outside diameter of about 14 mm. The outside diameter is the largest diameter of the connector. Connectors according to various embodiments disclosed herein may have an outside diameter less than or equal to about 15.8 mm.

The ferrule 308 of the connector 300 has a diameter of about 2500 microns. The front portion of various embodiments disclosed herein may be configured as an SC type connector.

Figure 4:
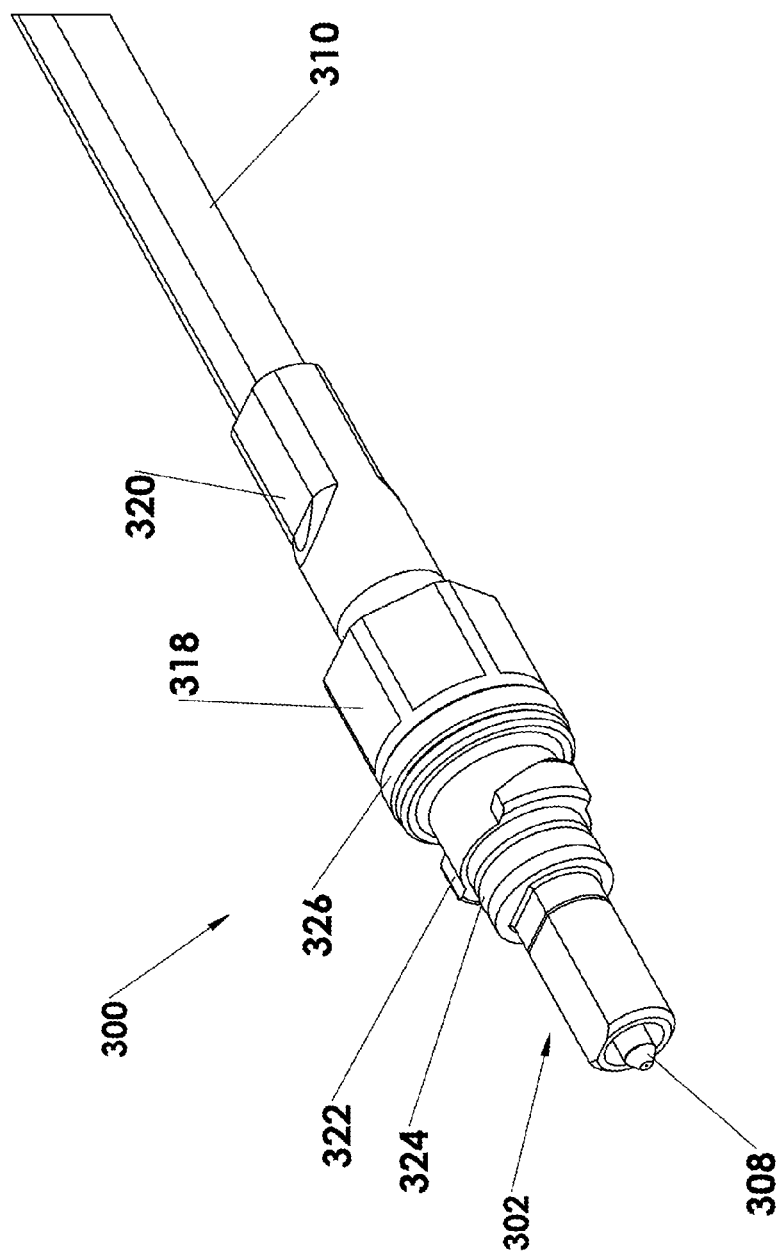
FIG. 4 is a perspective view of the fiber optic connector of FIG. 3 according to aspects of the present disclosure.

FIG. 4 is a perspective view of the fiber optic connector 300 of FIG. 3, shown in assembled form. Assembly of the connector 300 includes injecting the peripheral channels of the rear portion with adhesive, and applying adhesive to the central channel at a position close to optical cable. The assembly further includes coupling the optical cable with the rear portion of the connector housing 302 such that the central channel couples with the optical fiber and the peripheral channels couple with the two strength members. The assembly is then allowed to cure. After a very brief cure time, the ferrule end face may be polished. The ¼ turn coupling nut may then be slid up and either a strain relief boot is slid on or a short piece of heat shrink is positioned and melted in place. In addition to covering the transition between the end of the cable jacket and the end of the metal connector housing, the boot or heat shrink tube acts as a collar to keep the ¼ turn nut in position around the inner plug, else the coupling nut could slide backwards along the length of the drop cable. Assembly may further include adding a small rubber O-ring to the tip of the connector and adding a larger O-ring and flat rubber ring onto the ¼ turn coupling nut. The larger rubber ring is a friction band that prevents accidental loosening of the coupling nut.

Figure 5:
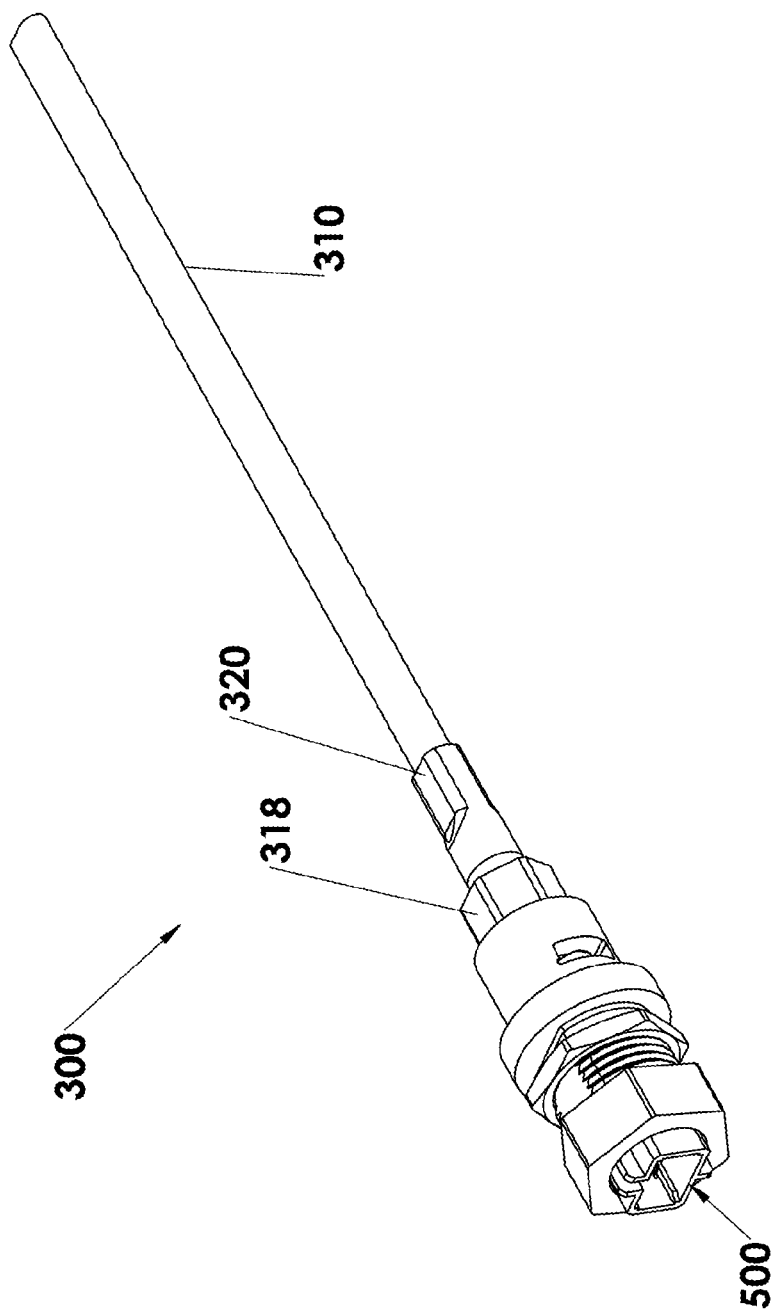
FIG. 5 is a perspective view of the fiber optic connector of FIG. 3 coupled to an adapter according to aspects of the present disclosure.

FIG. 5 is a perspective view of the fiber optic connector 300 of FIG. 4 coupled to an adapter 500 according to aspects of the present disclosure. The coupling nut 318 coupled to the rear portion of the connector housing of the connector 300 is configured to couple with the adapter 500.

Figure 6:
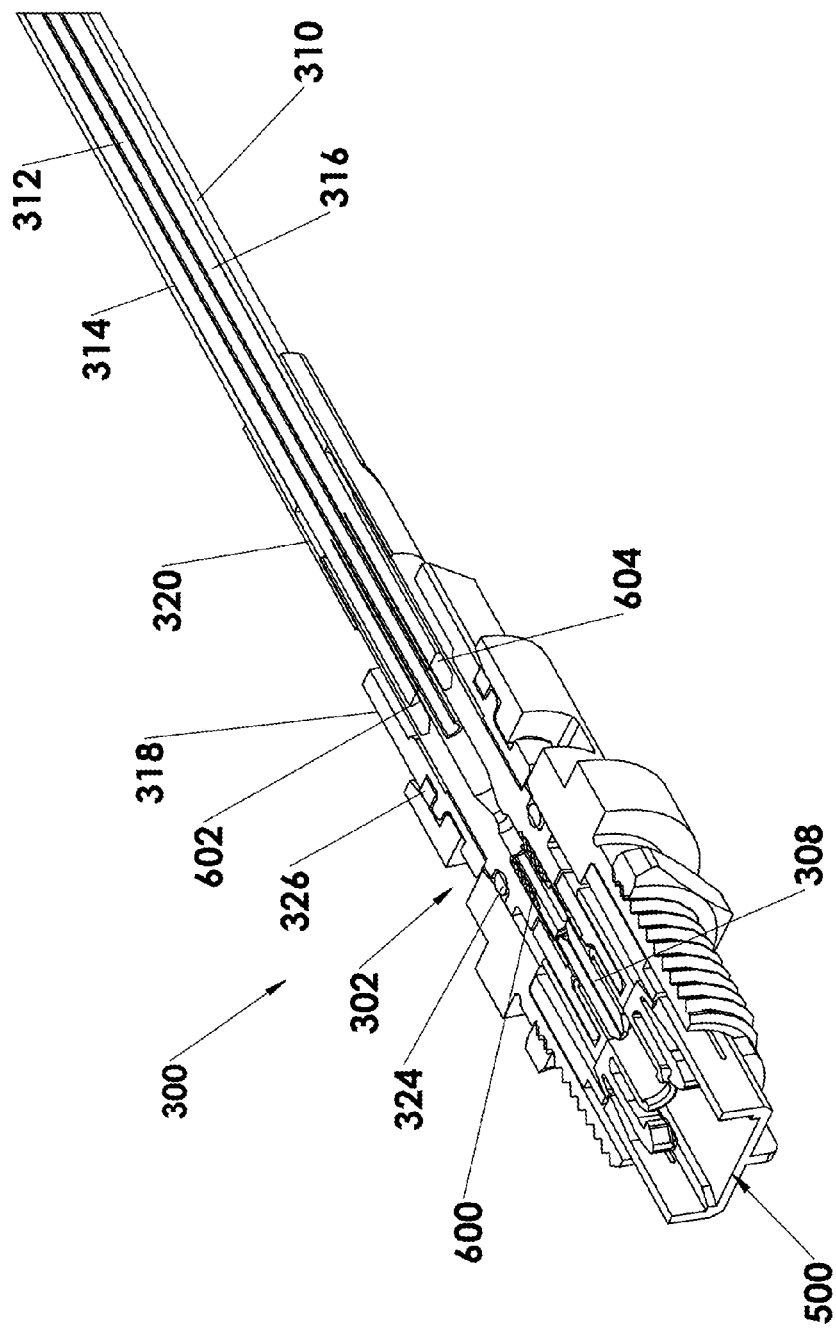
FIG. 6 is a sectional view of the fiber optic connector and adapter of FIG. 5 according to aspects of the present disclosure.

FIG. 6 is a sectional view of the fiber optic connector and adapter of FIG. 5 according to aspects of the present disclosure. FIG. 6 further shows the plurality of channels of the connector housing 302. The first channel 600 is positioned centrally, extends to the ferrule 308, and is coupled to the optical fiber 312. The second and third channels 602 and 604 are shown coupled to the strength members 314 and 316 respectively. These peripheral channels have a limited depth configured to receive the strength members of the optical cable 310.

Figure 7:
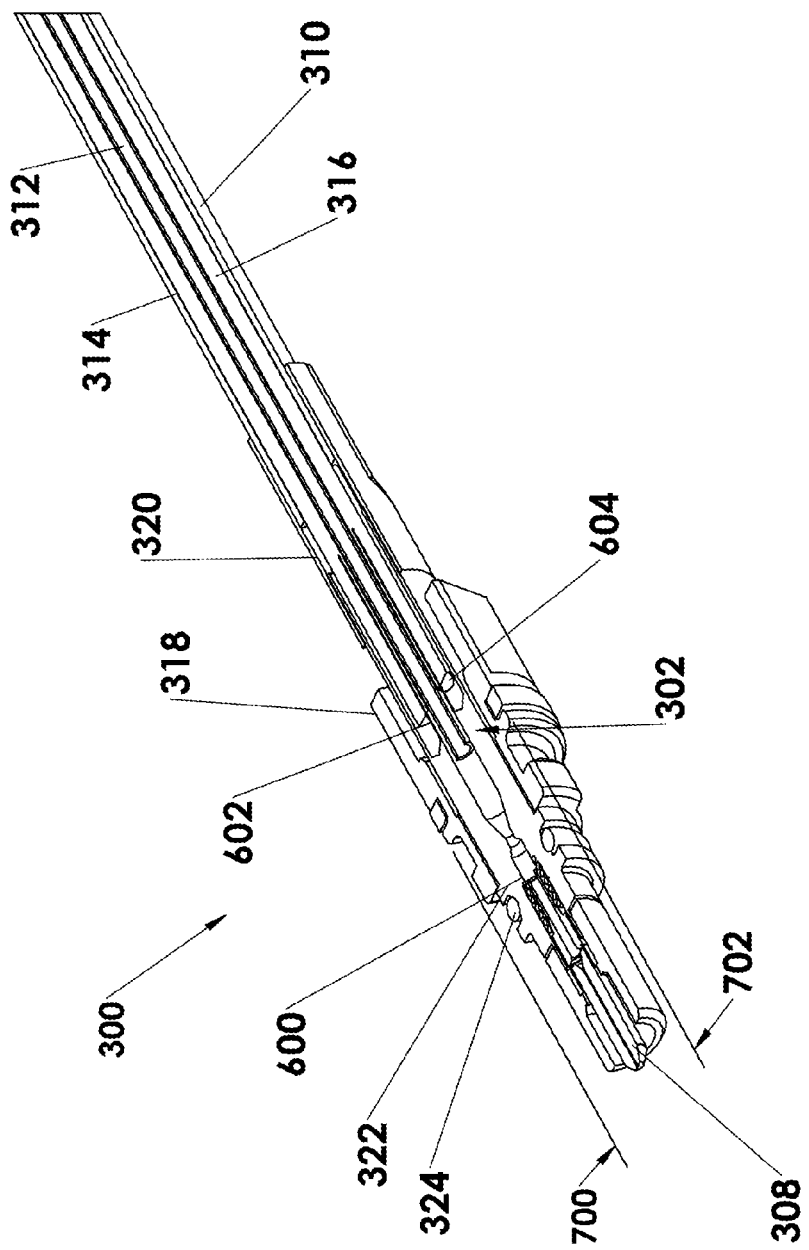
FIG. 7 is a sectional view of the fiber optic connector of FIG. 3, showing the outside diameter according to aspects of the present disclosure.

FIG. 7 is a sectional view of the fiber optic connector of FIG. 3, further showing the outside diameter of the connector 300 to be the outermost cross-sectional diameter of the connector as marked between the arrows 700 and 702.

Various embodiments may further provide multi-fiber connectors and adapters. For example, the single-fiber connector 300 described in relation to FIGS. 3 to 7 may be used in conjunction with cables having two or more fibers. Various embodiments of connectors and adapters disclosed herein may thus include multi-fiber ferrules such as the MT-RJ ferrule having two fibers and the MT ferrule having four or more fibers.

Figure 8:
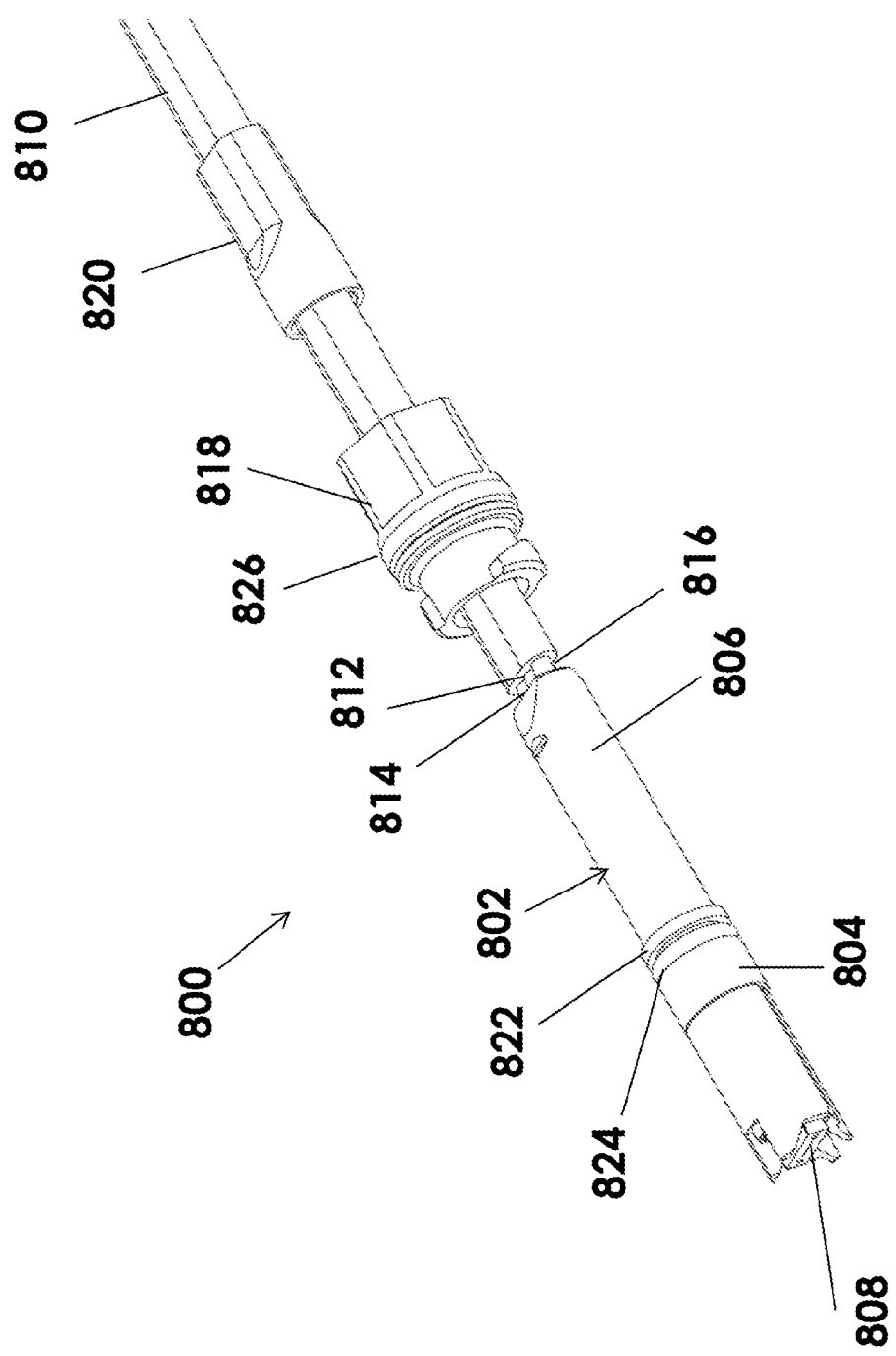
FIG. 8 is a perspective partially disassembled view of a fiber optic connector having a multi-fiber ferrule according to aspects of the present disclosure.

FIG. 8 shows a partially disassembled view of an ingress protected fiber optic connector 800 for multi-fiber cables according to aspects of the present disclosure. The fiber optic connector 800 includes a connector housing 802 including a front portion 804 and a rear portion 806. The connector 800 further includes a ferrule 808 which is housed within the connector housing 802 and projects from the front portion 804. In this embodiment, the ferrule 808 is a multi-fiber ferrule, specifically an MT-RJ ferrule having two fibers.

FIG. 8 further shows an optical fiber cable 810 having a multiple fibers 812, and two strength members 814 and 816. As shown, the multiple fibers 812 may be centrally positioned, whereas the strength members may be peripherally positioned within the optical cable 810.

The rear portion 806 includes a plurality of channels (not shown in FIG. 8 but shown and described further below in relation with FIG. 10). For example, the plurality of channels may include at least three channels. The plurality of channels may be configured to receive and couple to optical fibers and strength members of the optical cable 810. Specifically, a first channel of the plurality of channels is configured to receive multiple fibers of the cable 810. The first channel is further configured to extend to the multi-fiber ferrule 808 and thereby allow coupling of the optical fibers 812 to the ferrule 808.

Additional channels of the plurality of channels in the rear portion may be configured to receive strength members of the cable 810. For example, a second channel of the plurality of channels of the connector 800 is configured to receive the strength member 814 of the cable 810. Further, a third channel of the plurality of channels of the connector 800 is configured to receive the strength member 816 of the cable 810. Peripheral channels disposed in the rear portion 806, that is the second and third channels, may be coupled to the strength members 814 and 816 respectively using an adhesive. Further, the multi-fiber optical fiber 812 may be coupled to the first, central channel of the rear portion 806 using an adhesive.

In other embodiments, a connector may include a different number of channels than shown in FIG. 8. For example, a connector may include a plurality of channels configured to receive a plurality of optical fibers from a multi-fiber optical cable and to couple the optical fibers to the multi-fiber ferrule, and at least one channel configured to receive a strength member of the optical cable. Channels configured to receive strength members need not reach the front portion 804 of the connector 800.

The front portion 804 and the rear portion 806 of the connector 800 form an integral structure. Advantages of an integral structure include minimizing the number of constituent components and reducing the outside diameter of the connector. The connector housing 802 of the connector 800 comprises metal.

As shown in FIG. 8, the connector 800 further includes a coupling nut 818. The coupling nut may be disposed around the rear portion 806, as shown. A coupling nut may be provided for coupling to an adapter. In some embodiments, the coupling nut may be a ¼ turn coupling nut. In some embodiments, a connector may further comprising an adapter coupled to the connector housing by the coupling nut.

The connector 800 of FIG. 8 further comprises a strain relief boot 820. The strain relief boot 820 is disposed at a transition between the optical cable 810 and the rear portion 806 of the connector housing 802. In other embodiments, a connector may include a heat shrink at a transition between the optical cable and the rear portion of the connector housing. Further, the connector includes a stop 822 disposed on the connector housing 802. As shown, the coupling nut 818 is fixed in position between the stop 822 and the strain relief boot 820. In other embodiments, the coupling nut may be fixed between a stop and a heat shrink. This prevents the coupling nut from sliding along the connector 800 or the cable 810.

Various embodiments of connectors disclosed herein may be ingress protected and configured to withstand weather elements. Various embodiments may include at least one O-ring. For example, the optical fiber connector 800 includes a first O-ring 824 disposed near the stop 822, and a second O-ring 826 disposed at the coupling nut.

The optical fiber connector 800 is an ingress protected connector having an outside diameter of about 14 mm. The outside diameter is the largest diameter of the connector. Connectors according to various embodiments disclosed herein may have an outside diameter less than or equal to about 15.8 mm.

Figure 9:
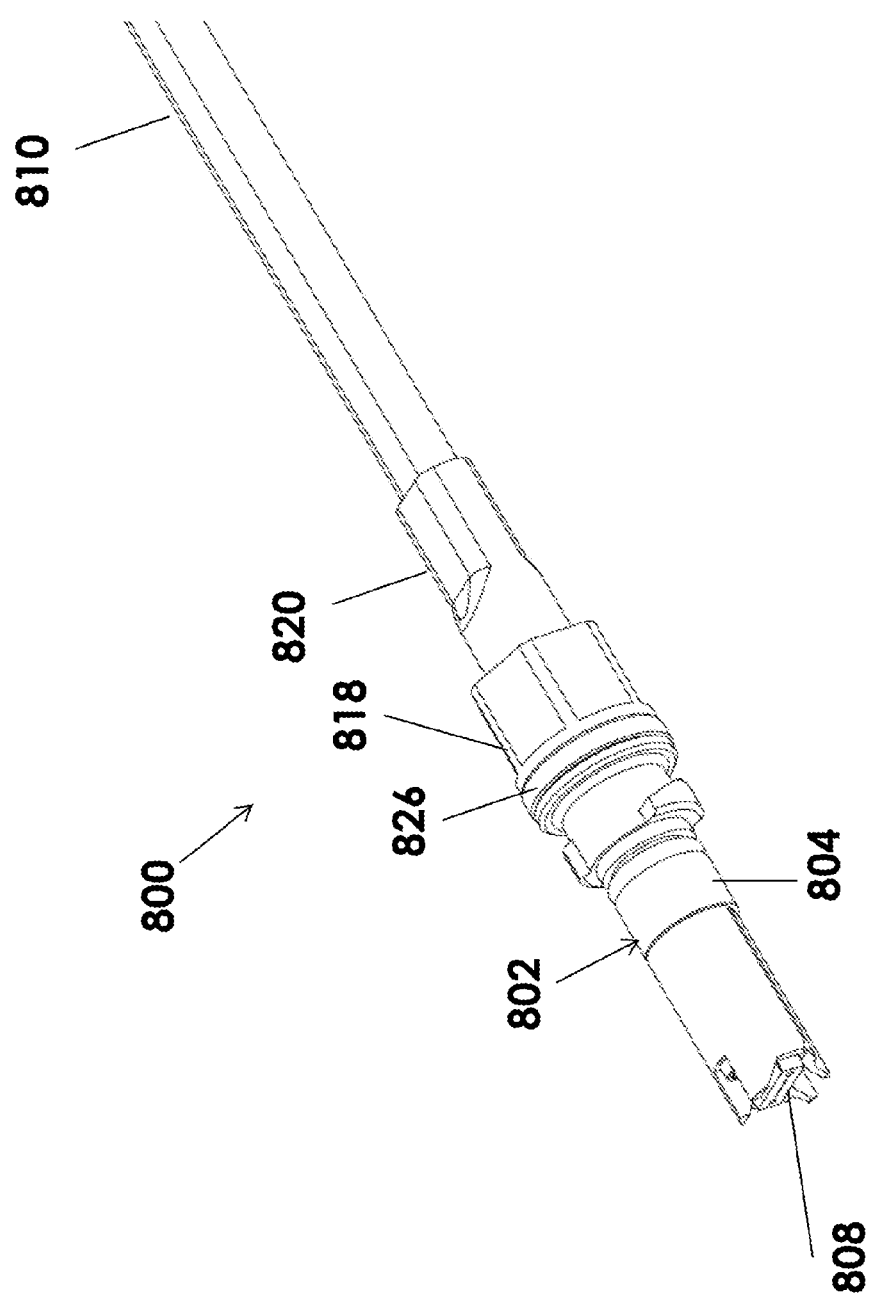
FIG. 9 is a perspective assembled view of the fiber optic connector of FIG. 8 according to aspects of the present disclosure.

FIG. 9 is a perspective view of the fiber optic connector 800 of FIG. 8, shown in assembled form. In one embodiment, assembly of the connector 800 includes injecting the peripheral channels of the rear portion with adhesive, and applying adhesive to the central channel at a position close to optical cable. The assembly further includes coupling the optical cable with the rear portion of the connector housing 802 such that the central channel couples with the optical fiber and the peripheral channels couple with the two strength members. The assembly is then allowed to cure. The ¼ turn coupling nut may then be slid up and either a strain relief boot is slid on or a short piece of heat shrink is positioned and melted in place. In addition to covering the transition between the end of the cable jacket and the end of the metal connector housing, the boot or heat shrink tube acts as a collar to keep the ¼ turn nut in position around the inner plug, else the coupling nut could slide backwards along the length of the drop cable. Assembly may further include adding a small rubber O-ring to the tip of the connector and adding a larger O-ring and flat rubber ring onto the ¼ turn coupling nut. The larger rubber ring is a friction band that prevents accidental loosening of the coupling nut.

Figure 10:
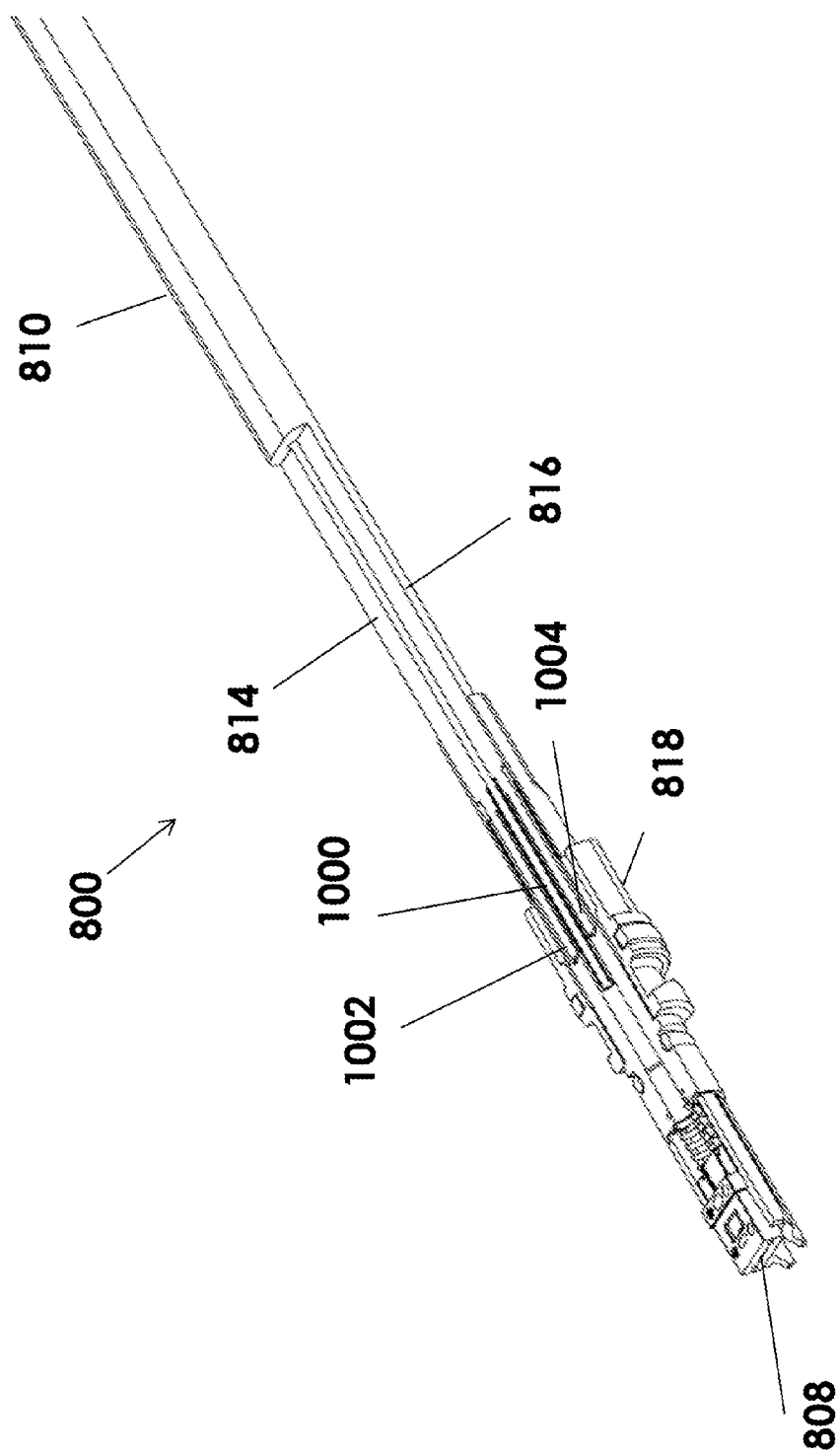
FIG. 10 is a sectional view of the fiber optic connector of FIG. 8 according to aspects of the present disclosure.

FIG. 10 shows a cross-sectional view of the connector 800 of FIG. 9. FIG. 10 further shows the plurality of channels of the connector housing 802. The first channel 1000 is positioned centrally, extends to the multi-fiber ferrule 808, and is coupled to the optical fiber 812. The second and third channels 1002 and 1004 are shown coupled to the strength members 814 and 816 respectively. These peripheral channels have a limited depth configured to receive the strength members of the optical cable 810.

Figure 11:
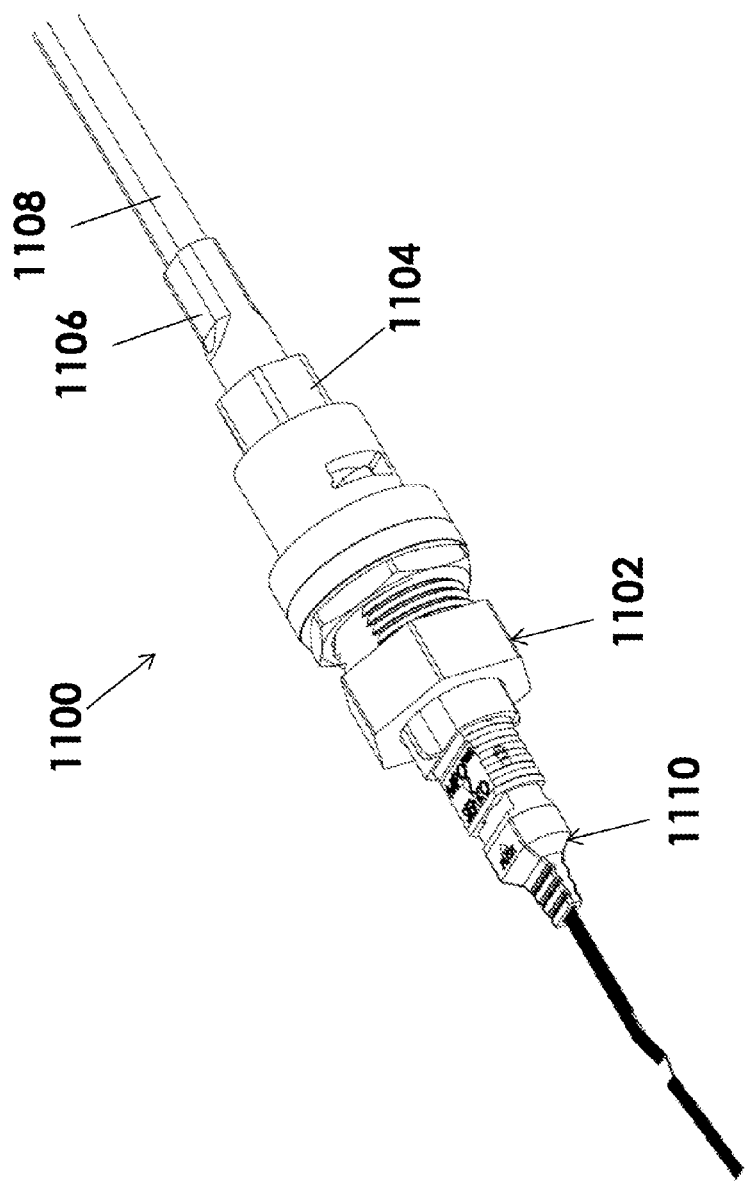
FIG. 11 is perspective view of a fiber optic connector and adapter coupled to a multi-fiber MT ferrule according to aspects of the present disclosure.

FIG. 11 is a perspective view of another embodiment of a multi-fiber optic connector 1100 coupled to an adapter 1102 according to aspects of the present disclosure. The coupling nut 1104 coupled to the rear portion of the connector housing of the connector 1100 is configured to couple with the adapter 1102. The strain relief boot 1106 is disposed at a transition between the optical cable 1108 and the rear portion of the connector housing. In this embodiment, the multi-fiber connector 1100 is coupled via the adapter 1102 to an MT/MPO ferrule 1110. The MT/MPO ferrule has multiple fibers, such as four or more fibers.

Figure 12:
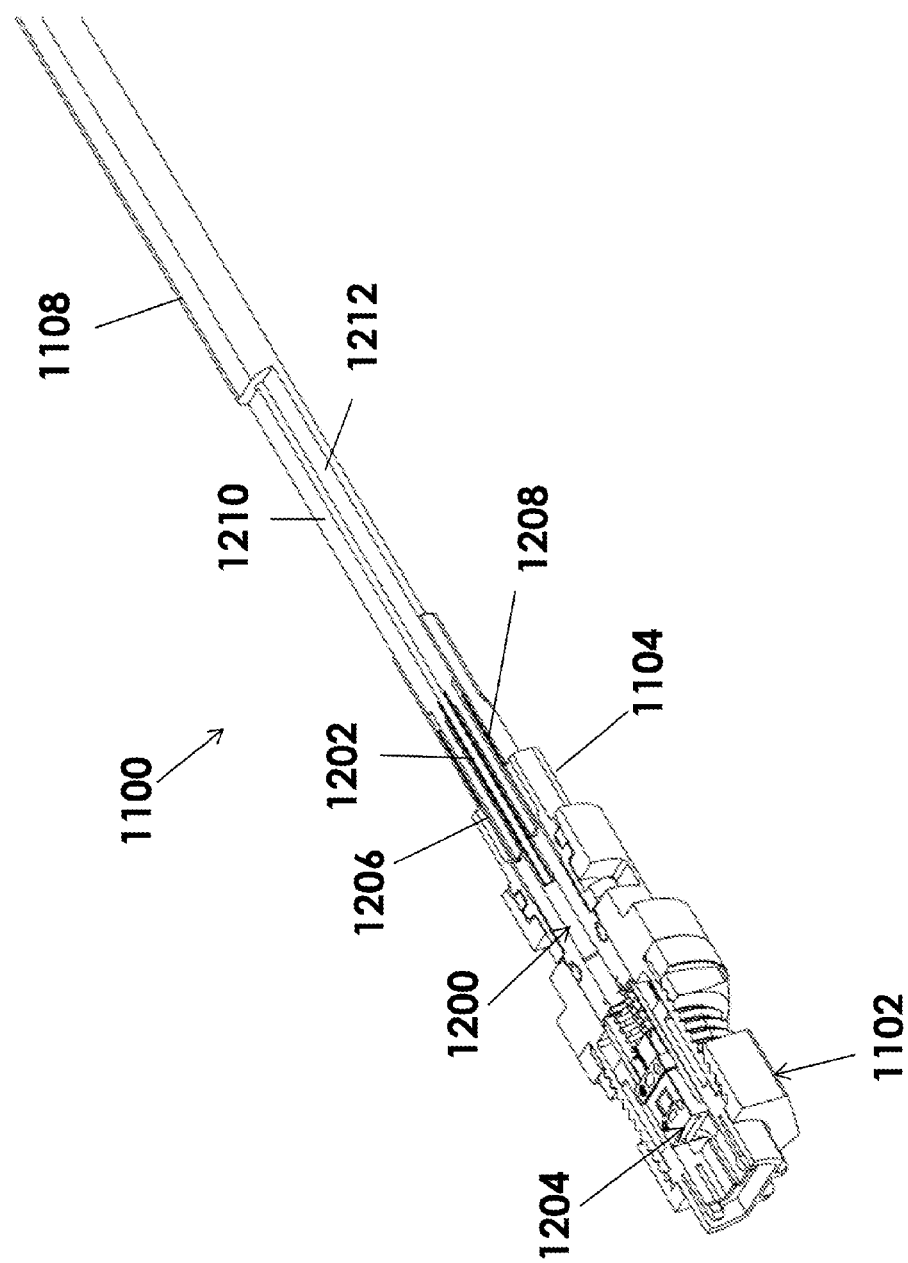
FIG. 12 is a sectional view of the fiber optic connector of FIG. 11 according to aspects of the present disclosure.

FIG. 12 is a cross-sectional view of the fiber optic connector 1100 and adapter 1102 of FIG. 11 according to aspects of the present disclosure. FIG. 12 further shows the plurality of channels of the connector housing 1200. The first channel 1202 is positioned centrally, extends to the multi-fiber ferrule 1204, and is coupled to the optical fiber 1108. The second and third channels 1206 and 1208 are shown coupled to the strength members 1210 and 1212 respectively. These peripheral channels have a limited depth configured to receive the strength members of the optical cable 1108.

One advantage of embodiments of connectors provided herein is a smaller outside diameter as compared with prior art embodiments. For example, in various embodiment disclosed herein, an outside diameter of an optical fiber connector may be about 14 mm for an ingress-protected connector. In other embodiments, the optical fiber connectors may have an outside diameter less than or equal to about 15.8 mm. Another advantage is a simplified construction of connectors and reduced manufacturing costs as fewer different parts need to be designed, tooled and constructed, and inventories of parts can also be minimized.

Various parts, components or configurations described with respect to any one embodiment above may also be adapted to any others of the embodiments provided.

This disclosure is not limited to the particular systems, devices and methods described, as these may vary. The terminology used in the description is for the purpose of describing the particular versions or embodiments only, and is not intended to limit the scope.

In the above detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be used, and other changes may be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds, compositions or biological systems, which can, of course, vary. It is also to be understood that the terminology used herein is for the purpose of describing particular embodiments only, and is not intended to be limiting.

As used in this document, the singular forms "a," "an," and "the" include plural references unless the context clearly dictates otherwise. Unless defined otherwise, all technical and scientific terms used herein have the same meanings as commonly understood by one of ordinary skill in the art. Nothing in this disclosure is to be construed as an admission that the embodiments described in this disclosure are not entitled to antedate such disclosure by virtue of prior invention. As used in this document, the term "comprising" means "including, but not limited to."

While various compositions, methods, and devices are described in terms of "comprising" various components or steps (interpreted as meaning "including, but not limited to"), the compositions, methods, and devices can also "consist essentially of" or "consist of" the various components and steps, and such terminology should be interpreted as defining essentially closed-member groups.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

Various of the above-disclosed and other features and functions, or alternatives thereof, may be combined into many other different systems or applications. Various presently unforeseen or unanticipated alternatives, modifications, variations or improvements therein may be subsequently made by those skilled in the art, each of which is also intended to be encompassed by the disclosed embodiments.

The invention claimed is:
1. A multi-fiber optical fiber connector comprising:
   a connector housing having a front portion and a rear portion, the front portion and the rear portion being an assembly having an integral structure; and
   a multi-fiber ferrule disposed in the connector housing such that it projects from the front portion of the connector housing;

wherein the rear portion of the connector housing includes a plurality of channels, at least a first channel of the plurality of channels being configured to receive a plurality of optical fibers of an optical cable and to couple the optical fibers to the ferrule, and a second channel of the plurality of channels being configured to receive a strength member of the optical cable.

2. The multi-fiber optical fiber connector of claim 1, having an outside diameter of less than or equal to about 15.8 mm.

3. The multi-fiber optical fiber connector of claim 1, wherein the multi-fiber optical fiber connector is an ingress protected multi-fiber optical fiber connector, having an outside diameter of about 14 mm.

4. The multi-fiber optical fiber connector of claim 1, further comprising a coupling nut disposed around the rear portion.

5. The multi-fiber optical fiber connector of claim 4, wherein the coupling nut is a ¼ turn coupling nut.

6. The multi-fiber optical fiber connector of claim 4, further comprising an adapter coupled to the connector housing by the coupling nut.

7. The multi-fiber optical fiber connector of claim 4, further comprising one of a strain relief boot and a heat shrink at a transition between the optical cable and the rear portion of the connector housing.

8. The multi-fiber optical fiber connector of claim 7, wherein the coupling nut is fixed in position between a stop disposed on the connector housing and said one of the strain relief boot and the heat shrink.

9. The multi-fiber optical fiber connector of claim 8, further comprising at least one O-ring.

10. The multi-fiber optical fiber connector of claim 9, wherein the at least one O-ring includes a first O-ring disposed near the stop and a second O-ring disposed at the coupling nut.

11. The multi-fiber optical fiber connector of claim 10, having an outside diameter of about 14 mm.

12. The multi-fiber optical fiber connector of claim 1, wherein the ferrule is one of an MT-RJ ferrule and an MT/MPO ferrule.

13. The multi-fiber optical fiber connector of claim 1, wherein the connector housing comprises metal.

14. The multi-fiber optical fiber connector of claim 1, wherein the second channel of the plurality of channels is coupled to the strength member of the optical cable using an adhesive.

15. The multi-fiber optical fiber connector of claim 14, wherein the at least first channel of the plurality of channels is coupled to the optical fibers of the optical cable using an adhesive.

* * * * *